May 6, 1952 — E. J. LAVANDER — 2,595,862
GLASS CUTTING DEVICE
Filed March 24, 1949
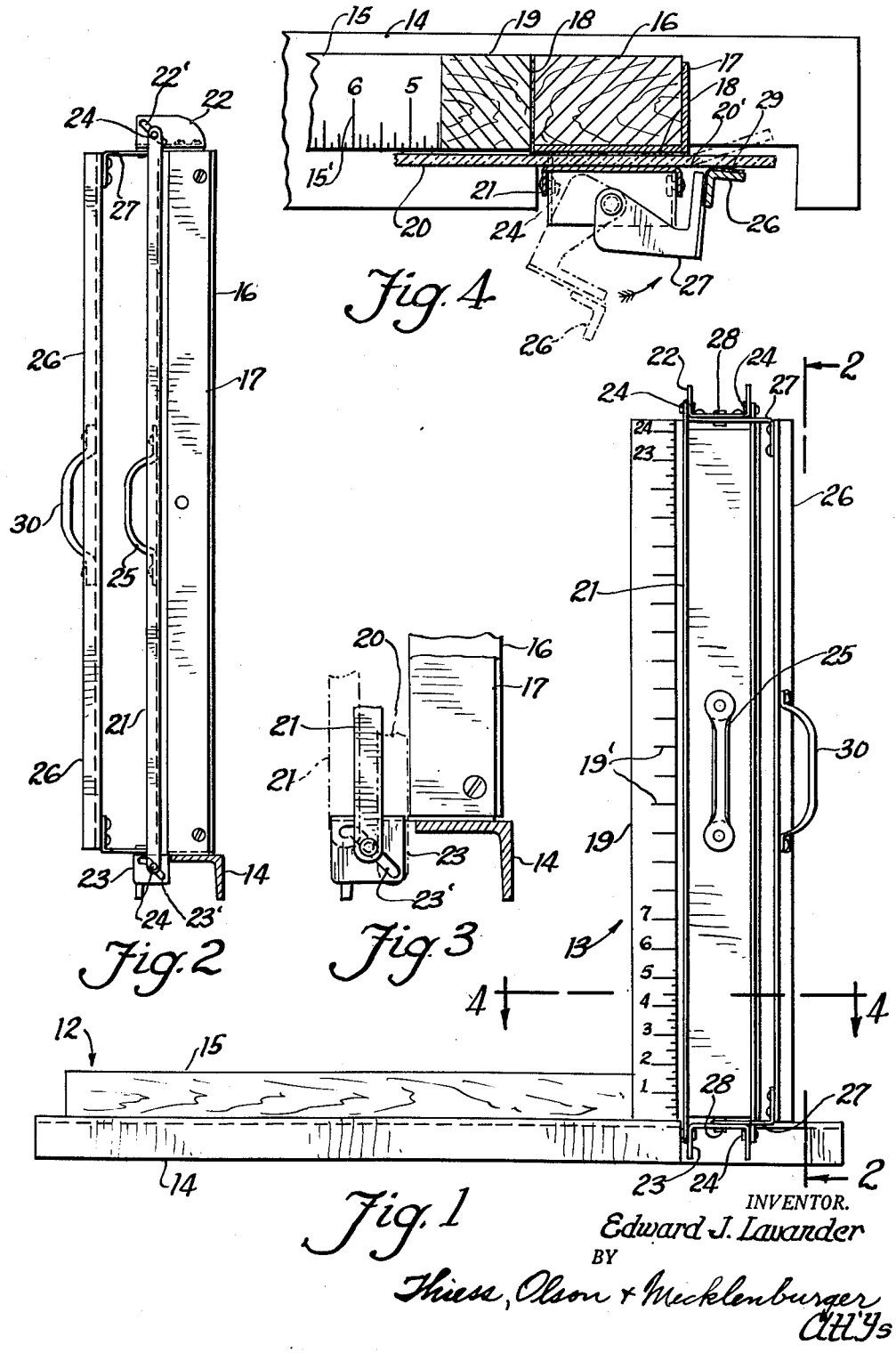
INVENTOR.
Edward J. Lavander
BY
Thiess, Olson & Mecklenburger
Att'ys

Patented May 6, 1952

2,595,862

UNITED STATES PATENT OFFICE 2,595,862

GLASS CUTTING DEVICE

Edward J. Lavander, Chicago, Ill., assignor, by mesne assignments, to Verticraft Mfg. Corporation, Chicago, Ill., a corporation of Illinois Application March 24, 1949, Serial No. 83,233

5 Claims. (Cl. 49—48)

This invention relates to a glass cutter and it is an object of this invention to provide an improved device of that character.

According to the preferred embodiment of this invention, a pivoted breaking arm is provided which is adapted to strike the glass to be cut, adjacent the scored line. The breaking member is arranged to make linear contact with the glass so that uniform pressure is exerted against the glass along the entire length of proposed cut. A glass-clamping member is provided as an integral part of the glass cutter, the member being arranged to move toward and away from a complementary frame element to receive and clamp the glass to be cut and, during this motion, is held always parallel to that frame element so that any thickness of glass is held tightly and securely along the entire width of the glass adjacent the proposed cut.

Accordingly, it is another object of this invention to provide a glass cutter having a breaking arm adapted to strike the glass on a line adjacent the proposed cut and extending along the entire width of the glass to be cut.

It is another object of this invention to provide a glass cutter having a holding or clamping device which clamps the glass to be cut tightly along the entire width of the glass adjacent the proposed cut.

It is another object of this invention to provide a glass cutter having a holding or clamping device which clamps the glass to be cut tightly along the entire width of the glass adjacent the proposed cut regardless of the thickness of the glass.

It is another object of this invention to provide a glass cutter which is convenient and easy to use and which reduces false breaks and chipping to a minimum.

It is another object of this invention to provide a glass cutter which has the numerous advantages stated above and which is at the same time simple in construction, rugged, and inexpensive.

This invention, together with further objects and advantages thereof, will best be understood by reference to the following description taken in connection with the accompanying drawing, and its scope will be pointed out in the appended claims.

In the drawing in which like parts are indicated by like reference numerals:

Figure 1 is a front-elevational view of a glass cutter incorporating one embodiment of this invention;

Fig. 2 is a cross-sectional view of the same glass cutter taken along the line 2—2 of Fig. 1;

Fig. 3 is a detail view of the lower guiding portion for the glass holding member; and Fig. 4 is a partial, cross-sectional view of the same glass cutter taken along the line 4—4 of Fig. 1.

A holding frame is provided consisting of a base rack 12 and a frame element 13. The frame element is preferably located at one end of base rack 12 and extends laterally therefrom. In normal use the base rack is horizontal and the frame element vertical.

The base rack consists of a channel iron 14 and a wooden bar 15 having measuring lines 15' ruled thereon in order to assist in cutting glass to the proper length. The frame element 13 consists primarily of a wooden bar 16 and an angle iron 17. The angle iron extends over the front face of the bar 16 and a fabric sheet 18 is made to adhere to the exposed face of angle iron 17 to reduce the danger of glass chipping or breakage which would exist if the glass were permitted to contact the angle iron. Fabric sheet 18 extends on around the adjoining face of bar 16 and is secured thereto. A second wooden bar 19 is attached to bar 16 and has measuring lines 19' ruled thereon to measure the width of glass as arranged in the glass cutter.

In the preferred embodiment shown and described, the frame element 13 is vertical but it will be apparent to those skilled in the art that the machine can be conveniently used in a horizontal position, for example.

In Fig. 4 a piece of glass 20 is shown in proper position in the glass cutter. It is apparent that the front face of bars 15 and 19 and of angle iron 17 lie in a single plane. It is against these surfaces that the glass 20 lies when properly arranged for the scoring and breaking operations. The lower edge of the glass rests on the upper face of channel iron 14, the weight of the glass being supported thereby.

The glass is held against frame element 13 by a clamping member 21 in the form of a channel iron. This member is mounted on the holding frame for movement toward and away from frame element 13, the form of mounting causing the clamping member to be always parallel to frame element 13.

Brackets 22 and 23, mounted on the two ends of bar 16, are both provided with a pair of slots 22' and 23', respectively, all four slots being parallel and extending outwardly of frame element 13 at an angle of 45 degrees thereto.

Clamping member 21 is provided with pins or rivets 24, rigidly secured thereto and adapted to ride in grooves 22' and 23'.

It will be apparent that since pins 24 fit snugly in these slots, the clamping frame will move always parallel to itself and to frame element 13. This is an important feature of the invention as it results in glass of any thickness (up to the maximum opening provided between the clamping member and frame element 13) being held with uniform pressure along its entire width. The necessity of adjusting the clamping member for varying thicknesses of glass is thereby avoided.

With the glass cutter in the vertical position as it is intended to be used, the slots 22' and 23' extend upwardly away from frame element 13. Accordingly, clamping member 21 tends to move downwardly toward the frame element and will so move under its own weight. When not otherwise restricted, this feature results in the glass being securely clamped in position for cutting and breaking without the use of a separately operable lock for the clamping member. Expressed differently, the clamping member is self locking.

In view of the fact that clamping member 21 will normally move to its clamping position under its own weight, another feature of this invention is provided in the embodiment shown for holding the clamping member in its open position in order that glass may be placed in the glass cutter without the necessity of manually holding the clamping member in its open position. At the upper and outward end of slots 23', the slots are extended horizontally a short distance, this horizontal extension providing a shelf on which the lower pins 24 of the clamping member may rest. When the clamping member is moved upwardly and outwardly to its full limit the lower pins 24 rest on this shelf-like portion of the slots 23 and hold the clamping member in its open position. A handle 25 is provided on the clamping member for convenient manipulation.

The breaking arm consists primarily of a small angle iron 26 and arms 27 connected thereto at the upper and lower extremities. Arms 27 are pivoted by rivets or pins 28 on the brackets 22 and 23 whereby the breaking member is free to rotate about a vertical axis.

As is best seen in Fig. 4, arms 27 are so designed as to extend around clamping member 21 even when the latter is in its open position and to permit the angle iron 26 to strike the glass 20 adjacent the breaking edge of angle iron 17 and the scored line 20'. The angle iron 26 is covered on its striking edge with a hard fabric 29 which results in a softer striking of the glass with more uniform pressure and thereby reduces the possibility of a chipping or false breaking of the glass. A handle 30 is provided on the breaking member for convenient manipulation.

It will be noted that in the embodiment shown and described that a section of the channel iron 14 is cut away to permit the mounting of bracket 23 and the swinging of the breaker arm. It will also be noted that the right-hand edge of the clamping member, as best seen in Fig. 4, is located a very short distance inwardly of the corner of angle iron 17. This short distance is preferably such that the right-hand edge of the clamping member may be used as a guide for a conventional glass scoring implement with the result that the scored line 20' appears immediately adjacent the corner of angle iron 17. Since the corner of that angle iron serves as the fulcrum for the breaking action, it is desirable that the scored line be immediately adjacent thereto. The edge of the clamping member thereby provides a steady, always present and always properly located guide for the scoring implement.

While particular embodiments of the invention have been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A glass cutting device comprising a glass-supporting frame including a base rack and a frame element extending laterally therefrom, said base rack and said frame element each having at least one glass-supporting edge, said edges lying in a single plane; a glass-clamping member mounted on said frame for limited movement toward and away from said frame element, said mounting including means having parallel slots and including pins slidable in said slots whereby said mounting holds said member parallel to said frame element substantially throughout such movement, said mounting also causing said clamping member to be urged toward said frame element and including means for releasably holding said clamping member in its full open position away from said frame element; and a breaking arm pivotally mounted on said frame for rotation about an axis parallel to said frame element.

2. A glass cutting device comprising a glass-supporting frame including a base rack and a frame element extending laterally therefrom, said base rack and said frame element each having at least one glass-supporting edge, said edges lying in a single plane, said frame element also having a breaking edge; a glass-clamping member mounted on said frame for limited movement toward and away from said frame element, said mounting including means having parallel slots inclined at an acute angle to the horizontal and including pins slidable in said slots whereby said mounting holds said member parallel to said frame element substantially throughout such movement, said mounting also causing said clamping member to be urged toward said frame element and including means for releasably holding said clamping member in its full open position away from said frame element; and a breaking arm pivotally mounted on said frame for rotation about an axis parallel to said breaking edge, said breaking arm being adapted to strike glass held in said glass cutting device along a line parallel to and adjacent said breaking edge.

3. A glass cutting device comprising a glass-supporting frame including a horizontal base rack and a vertical frame element, said base rack and said vertical element each having at least one glass-supporting edge, said edges lying in a single plane; a pair of brackets rigidly connected to said frame, one near the top of said vertical element and one near the bottom of said vertical element, each of said brackets having at least one slot and all of said slots being parallel and extending upwardly away from said frame element; a glass-clamping member mounted on said frame parallel to and adjacent said vertical element for limited movement toward and away from said frame element by means of pins connected to said member and slidable in said slots in said brackets, at least one of said slots having an irregular cut on its lower edge near its upward, outer end whereby said member is releasably held in its full open position away from said vertical element; and a breaking arm pivotally mounted on said frame for rotation about a vertical axis.

4. A glass cutting device comprising a glass-supporting frame including a horizontal base rack and a vertical frame element, said base rack and said vertical element each having at least one glass-supporting edge, said edges lying in a single plane, said frame element also having a breaking edge; a pair of brackets rigidly connected to said frame, one near the top of said vertical element and one near the bottom of said vertical element, each of said brackets having at least one slot and all of said slots being parallel and extending upwardly away from said frame element; a glass-clamping member mounted on said frame parallel to and adjacent said vertical element for limited movement toward and away from said frame element by means of pins connected to said member and slidable in said slots in said brackets, at least one of said slots having an irregular cut on its lower edge near its upward, outer end whereby said member is releasably held in its full open position away from said vertical element; and a breaking arm pivotally mounted on said frame for rotation about a vertical axis, said breaking arm being adapted to strike glass held in said glass cutting device along a line parallel to and adjacent said breaking edge.

5. Glass cutting apparatus which comprises a horizontal support on which a sheet of glass may rest, an upright support having a vertical edge, said upright support having a pair of inclined slots at vertically spaced positions, a clamping means to clamp the sheet of glass resting on said horizontal support against said upright support, said clamping means carrying pins received in said slots whereby said clamping means is gravity biased towards said upright support and a breaker arm pivoted relative to said upright support.

EDWARD J. LAVANDER.

REFERENCES CITED

The following references are of record in the file of this patent:

UNITED STATES PATENTS

| Number | Name | Date |
|---|---|---|
| 2,254,541 | Nordgren | Sept. 2, 1941 |